INVENTOR.
Arthur J. Frei
Raymond C. Davis
BY John T. Marvin.
Their Attorney

July 21, 1959 A. J. FREI ET AL 2,895,312
ICE CUBE TRAY

Filed June 24, 1957 2 Sheets-Sheet 2

INVENTOR.
Arthur J. Frei
BY Raymond C. Davis
John T. Marvin
Their Attorney

United States Patent Office 2,895,312
Patented July 21, 1959

2,895,312

ICE CUBE TRAY

Arthur J. Frei and Raymond C. Davis, Dayton, Ohio, assignors to General Motors Corporation, Detroit, Mich., a corporation of Delaware Application June 24, 1957, Serial No. 667,338

4 Claims. (Cl. 62—365)

This invention relates to refrigeration and particularly to a freezing device for liquids of the tray and grid type.

In the years of use of freezing devices of the character including a tray and a lever operated movable walled grid disposed therein those skilled in the art have been faced with the problem of reducing force required to be applied to the lever, in order to move or tilt walls of the grid within the tray, so as to minimize effort on the part of a housewife in releasing ice blocks from the device during an ice block harvesting operation. This problem has become more important with the advent of recent methods and arrangements for releasing and harvesting ice blocks from freezing devices such, for example, where a unitary tray and grid freezing device is invertedly supported on a portable ice bucket or other support and a lever is then manipulated to move walls of the grid and release ice blocks from their compartments into the bucket. We have discovered an arrangement of movable grid walls in a tray of a freezing device which reduces the force necessary to be exerted upon a lever by a housewife in order to move the grid walls for breaking the bond between these walls and ice blocks in the device and for releasing the ice blocks from the freezing device. By bowing substantially inflexible metal movable grid walls from end to end thereof and applying a force centrally thereto, when walls so shaped are embedded in ice in a tray, opposite the direction of bow of the walls when endeavoring to move same we found that the substantially inflexible walls spring and, due to their bowed configuration, have a tendency to draw their ends toward the point of application of force thereto. This springing of bowed grid walls creates a peeling action thereof away from ice blocks just prior to or simultaneously with moving the walls which serves to provide a highly desirable and advantageous result. By virtue of our discovery and arrangement of movable grid walls that are bowed as described in a tray of a freezing device the aforesaid problem is lessened and substantially eliminated as an objectionable task in an ice block harvesting operation. Our improvement is applicable to different types of freezing devices regardless of whether or not a grid is to be removed from a tray or is locked in a tray against detachment therefrom.

An object of our invention is to provide an improved freezing device of the tray and grid type wherein a unique arrangement of walls of the grid reduces force to be applied to a lever for moving the walls and releasing ice blocks from the device and which grid wall arrangement in a device of this character will have a minimum probability of breakage of the ice blocks.

Another object of our invention is to provide a grid for an ice tray freezing device with substantially inflexible walls which are so shaped and arranged that a springing movement of portions thereof peels same along a curved line away from ice blocks while the walls are being tilted or just prior thereto.

A further object of our invention is to provide a grid structure in a tray of a freezing device with one-piece walls which are straight from their top to their bottom and bowed about a substantially vertical axis intermediate their ends into arcuate shape and to apply a moving force centrally thereof in a direction opposite their bow whereby the bow of the walls cooperates with the force applying means to substantially peel the walls away from ice blocks in a direction beginning at their central portion toward ends thereof upon tilting the walls.

In carrying out the foregoing objects it is a still further and more specific object of our invention to provide a grid structure for use in a tray of an ice block freezing device with tiltable walls which are bowed in a direction longitudinally of the tray and are substantially peeled away from ice blocks therein just prior to or simultaneously with tilting thereof whereby to reduce the force required to move the grid walls.

Further objects and advantages of the present invention will be apparent from the following description, reference being had to the accompanying drawings, wherein a preferred form of the present invention is clearly shown.

Figure 1:
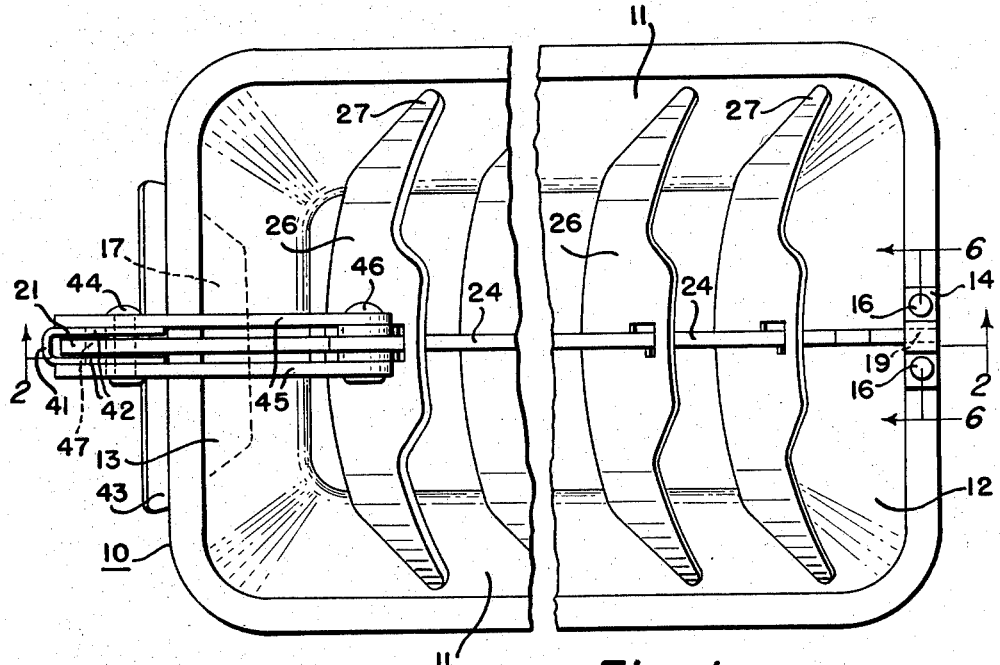
Figure 1 is a broken top plan view of a freezing device showing a grid therein with walls bowed in accordance with our invention.
Figure 2:
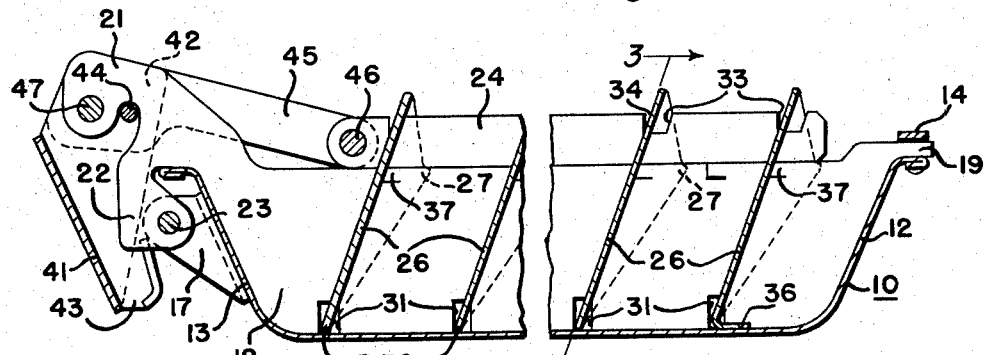
Figure 2 is a broken sectional view of the freezing device disclosed in Figure 1 and is taken on the line 2—2 thereof.
Figure 3:
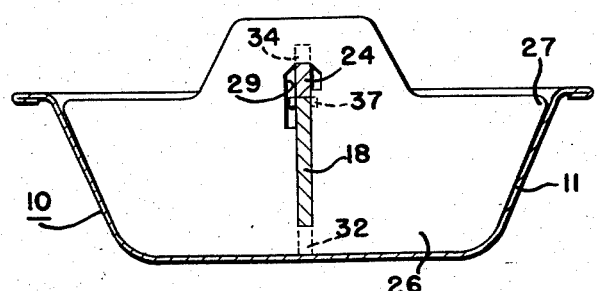
Figure 3 is a sectional view of the tray and grid of the freezing device disclosed in Figures 1 and 2 and is taken on the line 3—3 of Figure 2 showing transverse walls of the grid movably interlocked with a longitudinal partition thereof.
Figure 4:
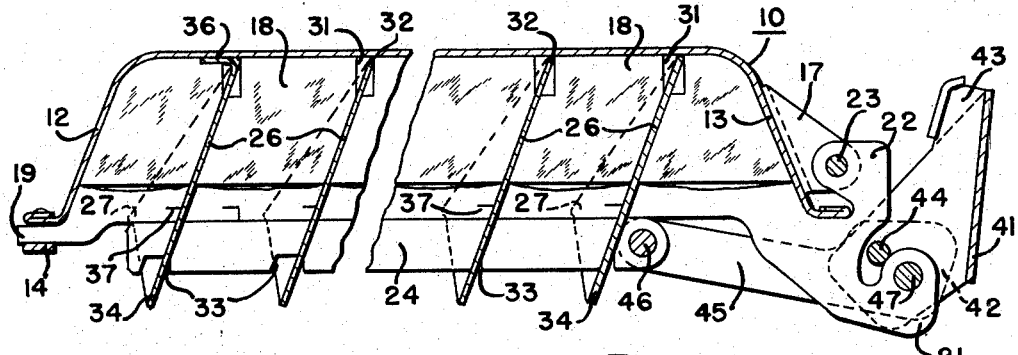
Figure 4 is a sectional view through the freezing device similar to Figure 2 showing the device inverted with a leverage mechanism thereon in a position to effect springing of one of the bowed grid walls in the device.
Figure 5:
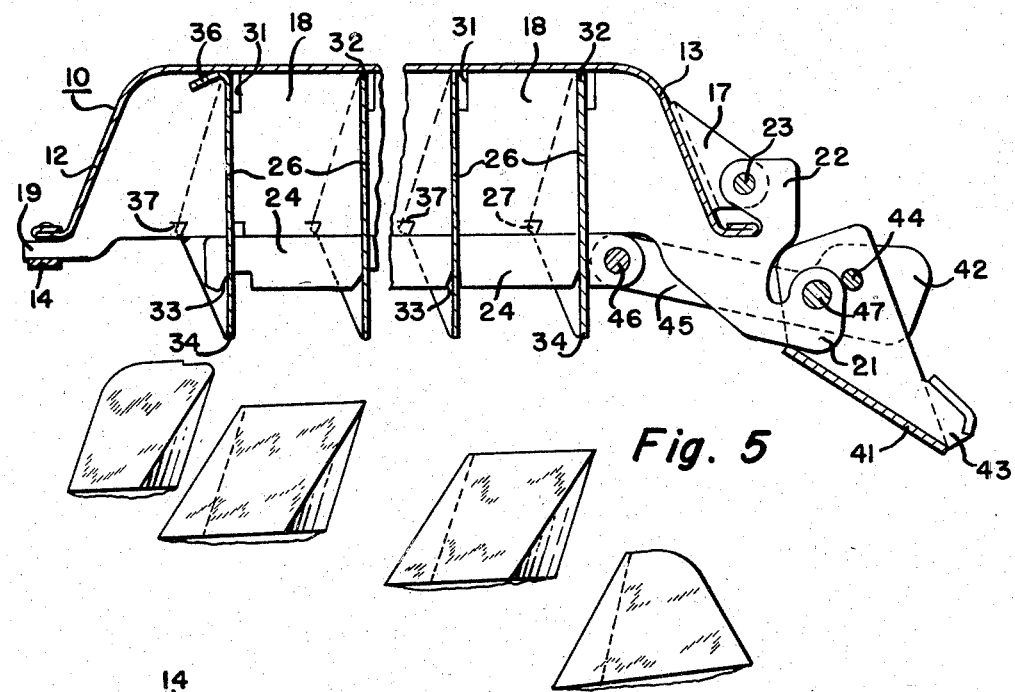
Figure 5 is a view similar to Figure 4 showing the leverage mechanism operated to tilt all walls of the grid for releasing ice blocks from the freezing device.
Figure 6:
Figure 6 is a fragmentary sectional view taken on the line 6—6 of Figure 1 showing the locking of one end of the grid in the tray of the device.

Referring to the drawings we show in Figure 1 thereof a freezing device including an elongated stamped sheet metal tray or pan 10 provided with a bottom and outwardly inclined sides 11 and ends 12 and 13 (see Figure 2). A grid structure is disposed in tray 10 and it may be removable therefrom as a unit but is preferably locked in the tray against detachment therefrom to make the freezing device a unitary structure capable of use in conjunction with recently developed ice ejecting arrangements. The rear end 12 of tray 10 is provided with a metal retainer strap 14 secured to the top of a rim extending around the tray, as by rivets 16, and providing an opening for a purpose to be presently described. Two opposed clamping brackets 17 are welded to the front end 13 of tray 10. The movable walled grid structure disposed in tray 10 includes a rigid longitudinal partition 18 provided with a rear projection 19 which is slipped into the opening between the tray rim and retainer strap 14. This partition 18 has its front end extended over the rim on tray 10 and is provided with an upwardly and outwardly directed projection 21 and a downwardly directed projection 22. A pin or rivet 23 fitted in suitable holes provided in the brackets 17 and in the projection 22 on partition 18 cooperates with the locking of rear projection 19 to the tray and locks the grid within tray 10 against detachment therefrom. There is an actuating wall member or bar 24 aligned with and disposed above partition 18. The grid structure also includes a plurality of spaced apart one-piece metal cross walls 26 having their lower edges loosely mounted at the bottom of partition 18 and having their upper edges loosely mounted upon wall member or bar 24 in such a manner that these continuous one-piece cross or transverse walls may be swung or tilted. Cross walls 26 are substantially inflexible but are shaped or bowed in a fashion which, when force is applied to a certain portion thereof in a predetermined direction, renders them momentarily springable. The cross walls 26 normally lie in an acute inclined angular plane with respect to the vertical and are adapted to be tilted toward the vertical by bar or wall member 24 while the grid structure remains locked in tray 10. The one-piece cross or transverse grid walls 26 are bent or bowed about a substantially vertical axis intermediate ends 27 thereof into arcuate shape but are straight or flat from their top to their bottom. This positions ends 27 of each of the walls 26 in a plane spaced from a parallel plane extended tangent to the central portion thereof to thereby form ice block compartments in the freezing device between the grid walls which are arcuate shaped in a direction transversely across tray 10. The walls 26 each have an elongated key-hole shaped opening 29 therein (see Figure 3) through which partition 18 and actuating bar or wall member 24 extend. Opening 29 in the cross walls is so shaped as to permit insertion of partition 18 and bar 24 into the openings of various walls 26 one after the other respectively during assembly of parts of the grid structure whereby wall or bar member 24 can be shifted above partition 18, while projecting through the openings 29, so as to loosely rest on the top of the partition. The lower edge of partition 18 has a series of notches 31 cut therein which loosely receive a web portion 32 at the bottom of walls 26. The actuating wall or bar member 24 has notches 33 cut therein and suitably spaced apart along its upper edge to loosely receive a continuous or web portion 34 of the cross walls 26. The method of assembling the grid parts 18, 24 and 26 into interlocked relatively movable association with one another is now well-known to those skilled in the art and it is believed to require no detailed or lengthy description herein. It is to be noted that the one cross wall 26 at the rear end of the unitary freezing device is provided with a lip 36 at its lower edge and this lip facilitates ejection of the pair of ice blocks at the back of the device. The upper edge of partition 18 is provided with a plurality of spaced apart laterally bent ears 37 which serve as stops for the bowed cross walls 26 and retain these walls in their correct incline from the vertical position while water in the device is being frozen into separated ice blocks within the compartments provided by walls of the grid. The ears 37 also serve to prevent lowering of the rear end of bar or wall member 24 relative to partition 18 whereby it is maintained in substantially vertical alignment with the partition.

A lever of a force multiplying leverage mechanism has a U-shaped central portion 41 providing legs 42 which straddle the projections 21 and 22 on the front end of partition 18 and also has laterally extending handle means 43 thereon. Legs 42 of the lever each have a hole provided therein and a pin or rivet 44 passes through these holes and through a hole provided in each of a pair of links 45 located on either side of the raised projection 21 of partition 18. The pin 44 attaches one end of the links 45 to legs 42 of the lever and the other end of these links 45 is attached to actuating bar 24 by a pin or rivet 46 and suitable spacers. The upper projection or hook-like extension 21 on partition 18 carries, in a hole provided therein, a stud 47 which extends into holes drilled in legs 42 of the lever and pivotally mounts the lever to the grid partition. Links 45 are shaped to at all times overlap or cover ends of stud 47 so that the lever cannot become detached from the projection 21 on partition 18. Movement of the legs 42 of the lever of the force multiplying leverage mechanism outwardly from the front of tray 10 rotates the pin 44 about the pivot stud 47 and shifts the links 45 and consequently actuating bar 24 forwardly, with respect to the longitudinal partition 18, and the bar moves or tilts the cross walls 26 out of their normal inclined position toward or into a vertical position progressively or one after the other in succession along the length of the unitary freezing device by virtue of the differential in width of notches 33 as is conventional in the art. Normally inclined grid walls when moved toward the vertical causes an enlargement of the ice block compartments as is well known to those skilled in the art and permits loosened ice blocks to be freely discharged from their compartments.

In accordance with our invention the bent or bowed shape of the grid cross walls 26, locked in tray 10 against detachment therefrom, is highly important to reducing the force required to be applied to a swingable lever of a leverage mechanism and is particularly advantageous in freezing devices invertedly supported upon an ice block storage receptacle or bucket and employing a relatively short lever to release ice blocks from a freezing device into the receptacle or bucket. After water has been frozen into separated ice blocks in the unitary freezing device herein disclosed and the device is invertedly supported on an ice bucket or the like such, for example, as is illustrated in the Arthur J. Frei Patent No. 2,809,499 dated October 15, 1957, assigned to the assignee of the present application, the leverage mechanism is operated to eject ice blocks downwardly out of the device. In this ice ejecting operation the longitudinal movement of actuating wall or bar member 24, created by swinging the lever of the leverage mechanism to shift links 45, is converted into angular movement of the transverse or cross walls 26 to tilt them one after another in succession from their inclined position toward the vertical whereby the ice blocks are readily released from their compartments. The arrangement and specific bending or bowing of the tiltable cross walls 26 of the grid structure in tray 10 of our freezing device together with the application of force to a central exposed upper part of these walls in a direction opposite the direction of bow thereof cooperate, upon initially applying force thereto for tilting same, to spring walls 26 which creates a peeling action thereof away from the ice blocks adjacent and bonded thereto. This springing of walls 26, and the peeling action resulting therefrom occurs in a direction beginning at the top center of the walls and extending toward their ends 27. In other words initial force applied to walls 26 tends to pull their ends 27, embedded in the ice, inwardly toward the center part of tray 10 just prior to or simultaneously with the tilting thereof. Thus the arrangement is such that the force applying means cooperates with the bend or bow in grid walls 26 to create a peeling action of the walls away from ice blocks bonded thereto, prior to or at the time these walls are tilted, in directions substantially transverse to the extension of partition 18 from centrally of the walls toward their ends. By this we mean that the moments of force applied to walls 26 in a direction opposite the direction of bow of the walls tends to spring or flex portions thereof and slide them along a curved line and the peeling action is therefore an inherent or natural characteristic of the bowed walls in the present arrangement. In this respect our invention is clearly differentiated from grid cross walls extending in a straight line transversely of a partition in a tray of a freezing device. The initial freeing or peeling of these walls away from ice blocks just prior to or simultaneously with the tilting thereof breaks up or divides the total force applied to the walls, to tilt them, into a plurality of smaller forces which lessens or reduces energy necessary to be exerted upon a lever of a manually actuated force multiplying leverage mechanism. Tests have indicated that, by bowing the grid cross walls 26 in the manner herein disclosed and applying force thereto as herein set forth, a 10% less force is required to be applied to a lever of a leverage mechanism to move grid walls as compared to that necessary to be applied to a lever to move or tilt grid walls which extend in a straight line. This advantage is very noticeable during ice block releasing operations performed in succession on our improved freezing device and on a conventional device and renders the device herein disclosed more desirable for use in conjunction with refrigerators.

From the foregoing it should be apparent to one skilled in the art that we have provided an important freezing device of the tray and grid type wherein the curving of continuous one-piece tiltable grid walls and the application of force thereto as herein disclosed cooperate to present advantages over known prior devices. Our improvement adds very little cost to the grid structure and yet provides a freezing device wherein the lever thereof is manipulated with a minimum effort on the part of a housewife during an ice block releasing and harvesting operation. The breaking up or dividing of the force applied to the grid walls to effect the peeling action thereof away from ice blocks prior to and/or simultaneously with tilting them reduces the likelihood of breaking or shattering ice blocks as they are released from walls of a freezing device. The advantages derived from our improved grid structure particularly renders the present freezing device applicable for inversion and use with a combined or unitary portable freezing device support and ice block storage bucket.

While the form of embodiment of the invention as herein disclosed constitutes a preferred form, it is to be understood that other forms might be adopted, as may come within the scope of the claims which follow.

What is claimed is as follows:

1. A freezing device comprising in combination, a tray, a grid disposed in said tray, said grid including a rigid longitudinal partition and a plurality of spaced apart one-piece walls extending continuously across said tray and being interlocked with said partition for tilting movement with respect thereto, said grid dividing the interior of said tray into compartments in which water is frozen into separated ice blocks, said one-piece grid walls being straight from their top to their bottom and bowed about an upright axis intermediate ends thereof into an arcuate shape, means engageable with the central portion of said bowed walls for applying force thereto in a direction opposite the direction of the bow thereof to tilt them relative to said partition for loosening ice blocks from said tray, and said grid walls being responsive to a force applied thereto by said means to substantially peel the walls simultaneously with the tilting thereof away from the ice blocks in two directions transverse to said partition from said central portion of the walls toward their ends.

2. A freezing device comprising in combination, a tray, a grid disposed in said tray, said grid including a rigid longitudinal partition and a plurality of spaced apart one-piece walls inclined with respect to the vertical extending continuously across said tray and being interlocked with said partition for tilting movement relative thereto, said grid dividing the interior of said tray into compartments in which water is frozen into separated ice blocks, said one-piece grid walls being straight from their top to their bottom and bowed about an upright axis intermediate ends thereof into arcuate shape, means engageable with an upper central portion of said bowed walls for applying force thereto in a direction opposite the direction of the bow thereof to tilt them with respect to said partition toward the vertical for loosening ice blocks from said tray, and said inclined grid walls being responsive to a force applied thereto by said means to substantially peel the walls simultaneously with the tilting thereof away from the ice blocks in two directions transverse to said partition from said central portion of the walls toward their ends.

3. A freezing device comprising in combination, an elongated tray, a grid disposed in said tray, said grid including at least one longitudinal partition and a plurality of spaced apart one-piece walls extending continuously across said partition from one side to the other side of said tray loosely interlocked with the partition for tilting movement relative thereto and an actuating member engageable with said walls intermediate their ends, said grid dividing the interior of said tray into compartments in which water is frozen into ice blocks, certain of said one-piece transverse grid walls having straight substantially parallel faces from their top to their bottom and being bowed about an upright axis between ends thereof into arcuate shape, said actuating member being shiftable lengthwise along said elongated tray for tilting said walls in a direction opposite the direction of the bow thereof with respect to said partition to break ice blocks loose from said tray, and said certain one-piece grid walls being responsive to force applied thereto by said actuating member for tilting them whereby they are peeled away from the ice blocks during tilting thereof in a direction laterally of said partition toward said ends of the walls.

4. A grid for disposition in an ice tray comprising, an elongated partition having a plurality of spaced apart one-piece walls extending continuously thereacross from one side to the other side thereof and interlocked therewith for tilting movement with respect thereto, said walls being straight from their top to their bottom and bowed about an upright axis intermediate ends thereof into an arcuate shape throughout their extension across said partition, and means on said grid adapted to engage and apply force to said bowed walls for tilting them in a direction opposite the direction of the bow thereof relative to said partition.

References Cited in the file of this patent

UNITED STATES PATENTS

| | | |
|---|---|---|
| 2,173,806 | Keighley | Sept. 19, 1939 |
| 2,226,184 | Storer | Dec. 24, 1940 |
| 2,251,460 | Miner | Aug. 5, 1941 |
| 2,495,506 | Buchanan | Jan. 24, 1950 |
| 2,674,860 | Hallock | Apr. 13, 1954 |